United States Patent [19]

Douglas

[11] Patent Number: 5,044,484
[45] Date of Patent: Sep. 3, 1991

[54] ENDLESS CONVEYOR ELEVATOR WITH FOLDABLE SUPPORT FRAME

[75] Inventor: Patrick J. Douglas, Santon, Isle of Man

[73] Assignee: Extec Screens & Crushers Limited, Sheffield, England

[21] Appl. No.: 438,483
[22] PCT Filed: Apr. 17, 1989
[86] PCT No.: PCT/GB89/00397
    § 371 Date: Jan. 23, 1990
    § 102(e) Date: Jan. 23, 1990
[87] PCT Pub. No.: WO89/09740
    PCT Pub. Date: Oct. 19, 1989

[30] Foreign Application Priority Data
Apr. 15, 1988 [GB] United Kingdom ............. 8808999

[51] Int. Cl.⁵ .................................................. B65G 15/26
[52] U.S. Cl. .................................... 198/313; 198/632; 198/861.2; 414/523; 414/528
[58] Field of Search .................. 198/313, 861.2, 632; 414/523, 528

[56] References Cited

U.S. PATENT DOCUMENTS

| 326,801 | 9/1885 | Sprague ............... 198/632 |
| 2,141,482 | 12/1938 | McCraw . |
| 2,632,556 | 3/1953 | Alpers et al. .......... 198/313 |
| 3,051,295 | 8/1962 | Moy . |
| 3,841,464 | 10/1974 | Tome ................. 198/861.2 |

FOREIGN PATENT DOCUMENTS

| 2330044 | 12/1973 | Fed. Rep. of Germany ...... 198/313 |
| 1105398 | 7/1984 | U.S.S.R. .................... 198/861.2 |
| 2001595 | 7/1977 | United Kingdom . |
| 2157645 | 10/1985 | United Kingdom . |

Primary Examiner—Robert P. Olszewski
Assistant Examiner—Cheryl L. Gastineau
Attorney, Agent, or Firm—Merchant, Gould, Smith, Edell, Welter & Schmidt

[57] ABSTRACT

There is disclosed an endless conveyor elevator with a foldable support frame, and which has a chassi (3), a tail conveyor section (1) pivotally connected at its tail end (2) to the chassis (3) and pivotally connected at its other end (4) to the lower end of an intermediate conveyor section (5). The upper end (6) of the intermediate conveyor section (5) is pivotally connected to one end of a head conveyor section (7). An actuator (12) is coupled with the conveyor sections to move them between an inoperative folded position, as shown in FIG. 1, to an unfolded rectilinear working position shown in FIG. 2. This movement of the conveyor sections between the inoperative and working positions is achieved by the geometry of the conveyor sections and that of a link member (9) which interconnects the chassis (3) and the head conveyor section (7).

6 Claims, 3 Drawing Sheets

ENDLESS CONVEYOR ELEVATOR WITH FOLDABLE SUPPORT FRAME

This invention relates to an endless conveyor elevator with a foldable support frame and is particularly, though not exclusively, concerned with a troughed-belt conveyor elevator having such a support frame.

Troughed-belt conveyors are commonly used to transport and to elevate bulk materials such as coal, soil, gravel and mineral ores, and the plant used for processing such bulk materials commonly incorporates such troughed-belt conveyors. When a processing plant which contains one or more troughed-belt conveyors is intended to be capable of being readily moved from place to place, either upon one site or between different sites, it is frequently found that size of the conveyors renders the plant unwieldy and difficult or impossible to move, especially if the plant is to be moved along public roads where there are legal limitations to the maximum overall dimensions of vehicles. Accordingly, there is a need for types of troughed belt conveyor which are readily foldable.

Hitherto, manufacturers of portable processing plant have used various means for constructing foldable frameworks for troughed belt conveyors, each more or less suited to the particular item of plant into which it is intended to be incorporated, and typically employing a telescopic or a hinged portion or a means for folding the conveyor sideways. However, such conveyors are often awkward or dangerous to fold and deploy, and when deployed they are often limited to less than optimum lengths by shortcomings of the folding mechanisms.

The present invention therefore seeks to provide a foldable support frame in or for an endless conveyor elevator, which is particularly simple and safe to operate between a folded transport position and an unfolded working position.

Desirably, the support frame should be such that the ratio between the open and the folded size envelopes should be exceptionally large. Also, desirably, the framework does not require assistance from an operative or an external lifting means when folding or deploying.

According to one aspect of the invention there is provided an endless conveyor elevator having a foldable suport frame and which comprises:

a chassis:

a tail conveyor portion pivotally mounted at one end on the chassis and intended to form a lower input end of the elevator;

a head conveyor portion intended to form an upper discharge end of the elevator;

an intermediate conveyor portion pivotally connected to the tail portion and to the head portion;

at least one link member pivotally connected at one end to the chassis and at its other end to the conveyor in the region of the pivotal connection between the head conveyor portion and the intermediate conveyor portion; and an actuator coupled with the conveyor elevator and operable to move the conveyor portions between an inoperative folded position and an unfolded working position;

in which the geometry of the conveyor portions and the link member, and the mounting of the tail conveyor portion and the link member on the chassis are such that;

when the conveyor elevator is in its folded inoperative position the tail conveyor portion is constrained to extend substantially horizontally over the chassis; the intermediate conveyor portion is constrained to extend upwardly of the tail portion; and the head conveyor portion is constrained to extend substantially horizontally of the upper end of the intermediate conveyor portion; and when the conveyor elevator is in its unfolded working position the conveyor portions extend substantially rectilinearly as a rigid assembly and in an upwardly sloping direction from the mounting of the tail portion on the chassis.

Thus, by simple operation of the actuator, the conveyor portions can be readily caused to move between the folded position when the conveyor elevator is inoperative and is ready for transportation to another working position or site, and its unfolded working position in which it slopes upwardly as a rigid assembly which is able to elevate bulk material supplied to the tail portion to a discharge outlet at the upper end of the head portion.

Preferably, the arrangement is such that, when in the working position, the conveyor portions are inclined to the chassis at an angle of up to 30°.

The invention is particularly applicable to an elevator formed by an endless troughed belt conveyor, though it should be understood that the invention is not restricted to such types of endless conveyor.

Preferably, the arrangement is such that the actuator is enabled to move the assembly of conveyor portions beyond the unfolded working position, so that it begins to fold in an opposite direction, in order that the free end of the head conveyor portion may be set lower than it would be if the three conveyor portions were held in the straight line working position first mentioned. Optionally, a fourth conveyor portion may be connected to the head conveyor portion, in order to extend the working length of the assembly of conveyor portions, the fourth portion being mechanically linked to the intermediate conveyor portion in such a manner that, in the folded position, it can be constrained to hang approximately vertically downwardly from the free end of the head conveyor portion, whereas in the working position the four conveyor portions are constrained to form a substantially straight framework. When, as in the further preferred arrangement, four conveyor portions are used, the fourth conveyor portion becomes in fact the new head end portion carrying the head drum for the conveyor belt, and the third conveyor portion will then cease to be the head portion, and will merely become a second intermediate conveyor portion.

According to a further aspect of the invention there is provided a foldable framework for an endless belt conveyor which comprises:

a substantially straight middle conveyor section pivotally connected at either end to a head conveyor section and a tail conveyor section respectively, said conveyor sections being mechanically linked such that in a working position they are constrained to lie in a substantially straight line end-to-end and in a folded position the head section and the tail section are constrained to project approximately perpendicularly and to one side of the middle section, and also the tail conveyor section is pivotally connected adjacent to its free end to a chassis member, and also at least one link member is provided which is pivotally connected at one end to the chassis member and which is pivotally connected at its other end to the assembly of conveyor sections in the vicinity of the joint between the head section and the middle section, and also an actuator means is provided to enable the assembly of conveyor sections to be moved back and forth between the working and the folded position, and furthermore all said members are so proportioned that when the conveyor sections are in the folded position, the tail end section is constrained to lie substantially horizontally upon the chassis member and the middle section is constrained to stand approximately vertically and the head end section is constrained to project approximately horizontally above the chassis member from the upper end of the middle conveyor section, and when the conveyor sections are in the working position the three sections are constrained to form a single substantially straight conveyor framework which is supported adjacent to its lowermost end upon the chassis member, and which is supported by the link member or members in the vicinity of its uppermost joint in such a manner that it slopes upwardly at an angle of not more than 30°.

Embodiments of endless conveyor elevator according to the invention will now be described in detail, by way of example only, with reference to the accompanying drawings, in which.

Figure 1:
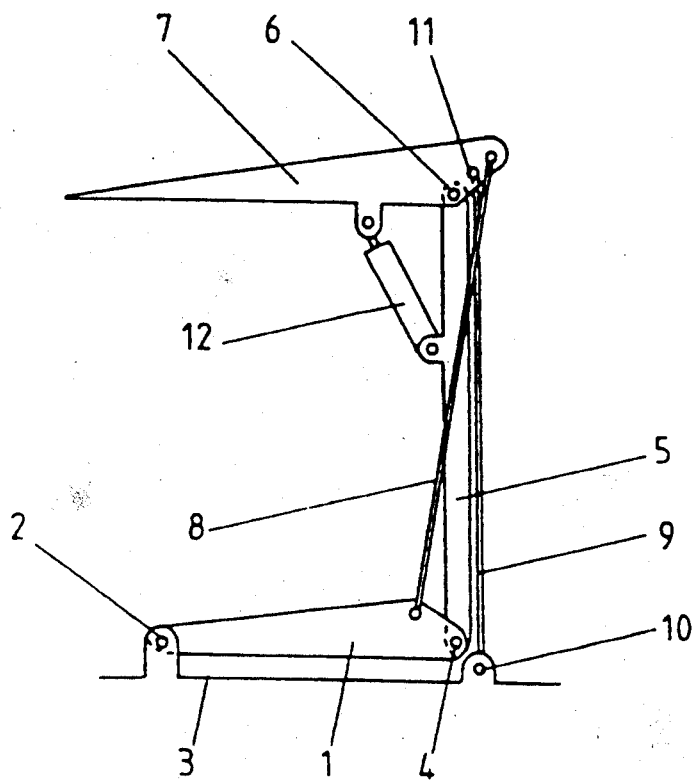
FIG. 1 is a schematic side view of a first embodiment of endless belt conveyor elevator and its foldable framework, shown in a folded inoperative position.
Figure 2:
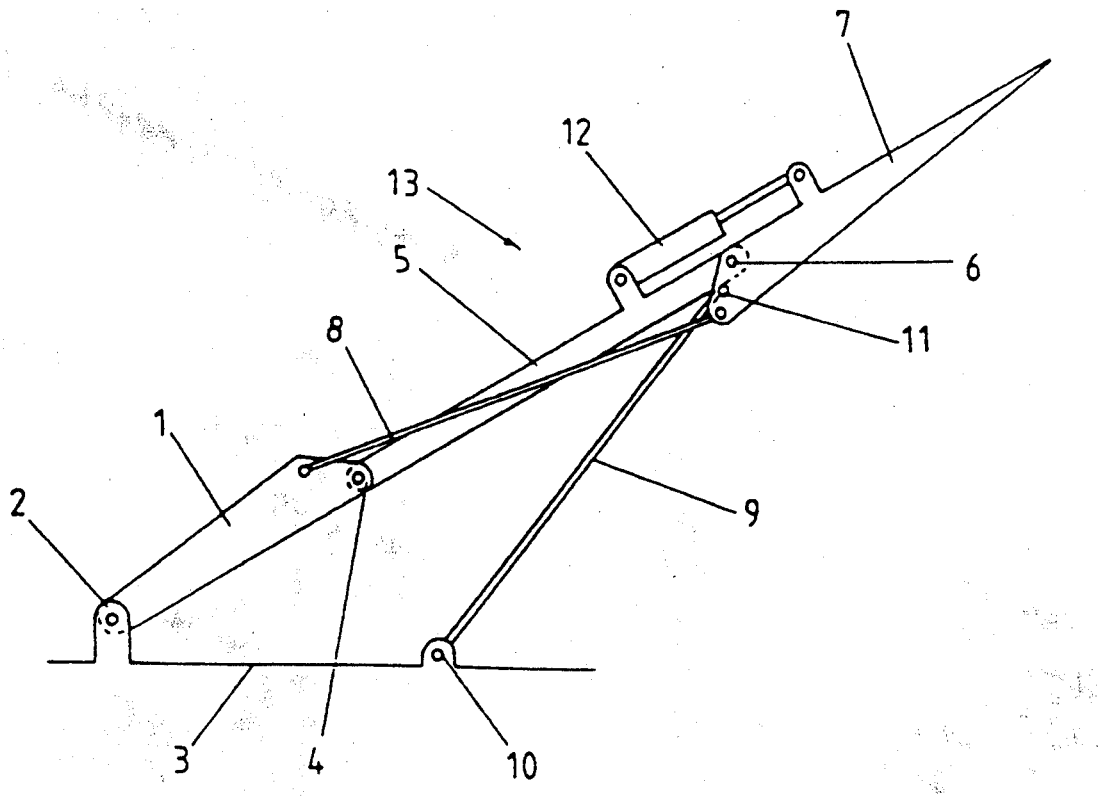
FIG. 2 is a schematic side view of the conveyor of FIG. 1, but unfolded into its working position.
Figure 3:
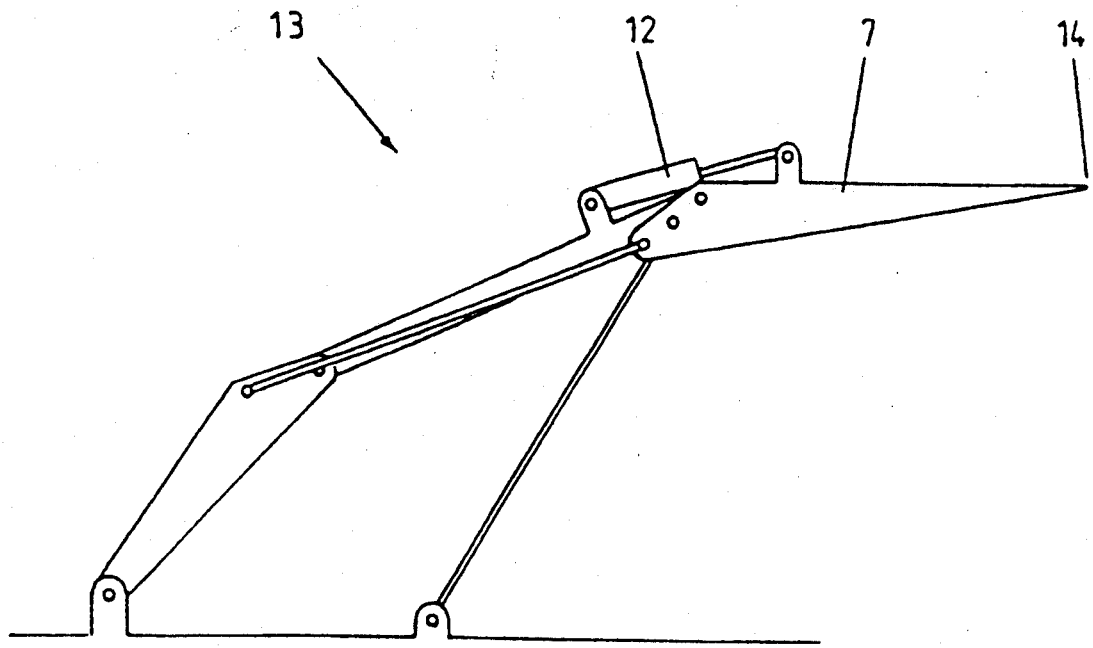
FIG. 3 is a view, similar to FIG. 2, showing the foldable framework deployed beyond the rectilinear working position shown in FIG. 2 into a further working position.

Referring now to FIGS. 1 to 3 of the drawings, there is shown a first embodiment of endless conveyor elevator with foldable support frame, and which has a chassis 3, a tail conveyor section 1 which is pivotally connected at its tail end 2 to the chassis 3, and which is pivotally connected at its other end 4 to the lower end of an intermediate conveyor section 5. The upper end 6 of the intermediate conveyor section 5 is pivotally connected to one end of a head conveyor section 7, which will be provided with a head drum (not shown) around which an endless conveyor belt (e.g. a troughed belt) can be taken.

A pair of cross-over links 8 are pivotally connected at their ends to the tail conveyor section 1 and to the head conveyor section 7, and the proportions of the various members 1, 5, 7 and 8 are so arranged that, in the folded position shown in FIG. 1, the tail conveyor section 1 and the head conveyor section 7 are constrained to project approximately perpendicularly and to one side of the intermediate conveyor section 5. A link member 9 is pivotally connected at its lower end to the chassis 3 and at its upper end 11 to the head conveyor section 7 in the vicinity of the joint 6 between the intermediate conveyor section 5 and the head conveyor section 7.

The proportions i.e. the geometry of the various members 1, 3, 5, 7 and 9 are so arranged that when the tail conveyor section 1 lies substantially horizontally upon the chassis 3 in the folded position, the intermediate conveyor section 5 is constrained to project substantially vertically upwards.

An actuator is coupled with the conveyor elevator and takes the form of a pair of hydraulic cylinder actuators 12 which are connected across the joint 6 between the intermediate conveyor 5 and the head end conveyor 7, and in the folded position shown these are in their fully retracted position. Operation of the actuator can then cause the conveyor elevator to be unfolded from its transport position shown in FIG. 1 to an unfolded rigid and substantially rectilinear working position as shown in FIG. 2.

Referring now to FIG. 2, it can be seen that the hydraulic cylinder actuators 12 have been extended, and that this has caused the three conveyor sections 1, 5 and 7 to straighten out end-to-end to form one continuous and substantially straight conveyor frame 13. Simultaneously, the pivot 2 and the link member 9 have constrained the entire assembly 13 to extend gently upwardly at an angle to the horizontal which is preferably between 15° and 25°, depending upon the material to be conveyed. It will be readily apparent that, in the working position shown in FIG. 2, the link member 9 constitutes a strut which supports the weight of the assembly 13.

Referring now to FIG. 3, there is shown a further working position of the conveyor elevator, in which the hydraulic cylinders 12 have been extended further, causing the assembly 13 to start to fold in a downward direction, and whereby the free end 14 of the head conveyor section 7 begins to dip downwardly. This optional manoeuvre may be useful when beginning to stockpile a dusty or brittle material, such as coal, in order to reduce the height of its fall.

Figure 4:
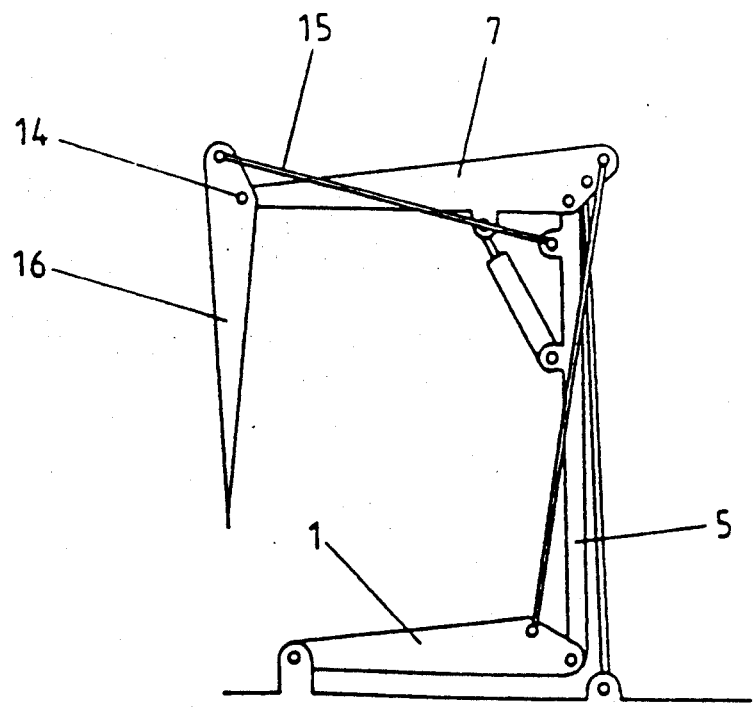
FIG. 4 is a schematic side view, similar to FIG. 1, of a further embodiment of conveyor elevator in its folded position: and, FIG. 5 is a view, similar to FIG. 2, showing the embodiment of FIG. 4 unfolded into its extended working position.
Figure 5:
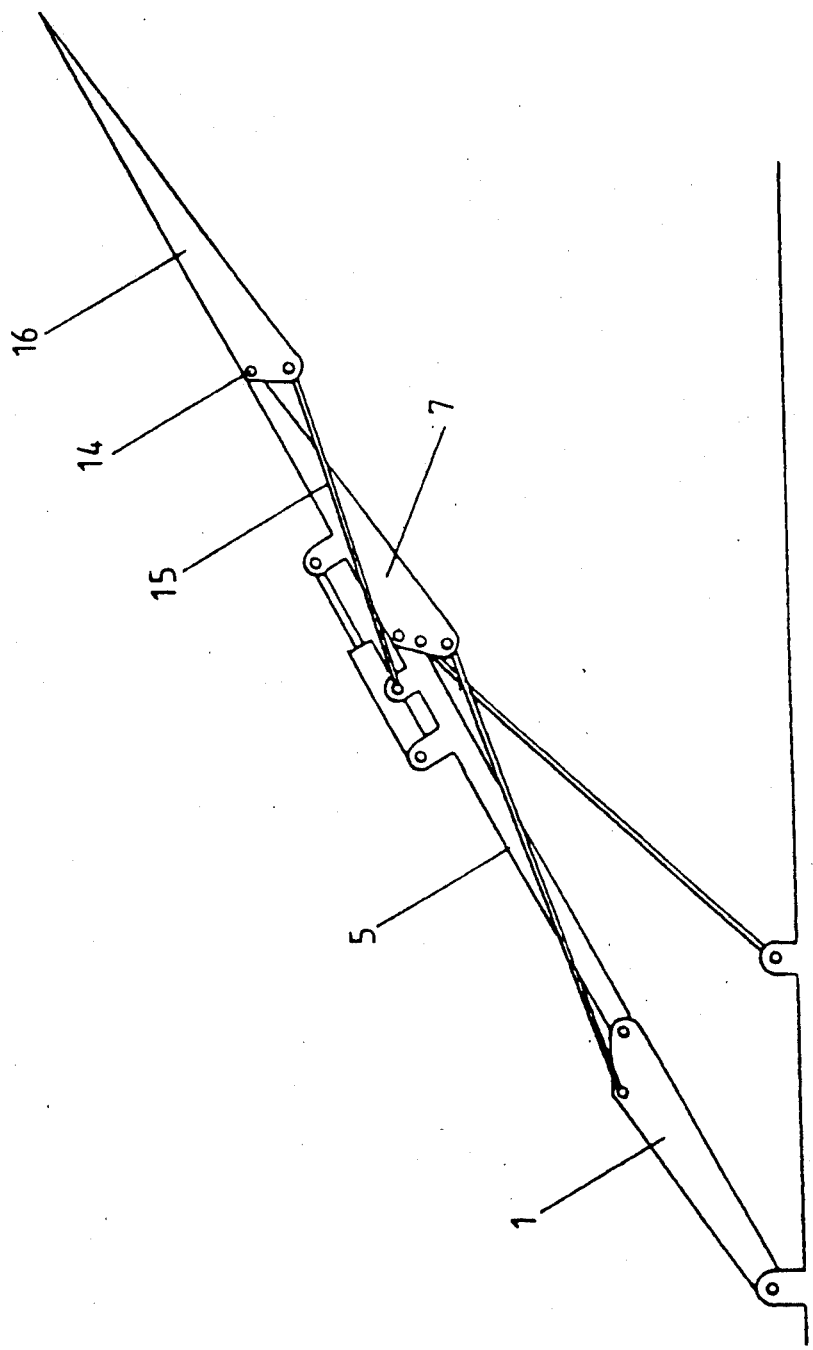

Referring now to FIGS. 4 and 5, a further embodiment of conveyor elevator is disclosed, which is composed of four conveyor sections, and parts corresponding with those already described are designated by the same reference numerals, and will not be described in detail again.

Thus, it will be apparent that the three lowermost conveyor sections 1, 5 and 7 are substantially the same as those already described, except that the intermediate section 5 now has attached to it a pair of cross links 15, and the head conveyor section 7 has a new conveyor section 16 pivotally connected at its free end 14. It will be apparent that, in the folded position shown in FIG. 4, the cross links 15 are so proportioned that they constrain the new head section 16 to hang in a substantially vertical attitude from the end 14 of the conveyor section 7.

FIG. 5 shows the assembly of the further embodiment in its working position, where it can be seen that the cross links 15 have pulled the head section 16 into line with the other three conveyor sections 1, 5 and 7, to create a substantially straight conveyor framework of exceptional length when compared to its folded dimension.

Although not shown in the drawings, the conveyor sections (1, 5, 7, 16) of the embodiments described above will be provided with suitable mountings to enable an endless troughed belt or other endless conveyor to be mounted thereon.

I claim:

1. An endless conveyor elevator having a foldable support frame and which comprises:

a chassis;

a tail conveyor portion pivotally mounted at one end on the chassis and intended to form a lower input end of the elevator;

a head conveyor portion intended to form an upper discharge end of the elevator;

an intermediate conveyor portion pivotally connected to the tail portion and to the head portion;

at least one link member pivotally connected at one end to the chassis and at its other end to the conveyor in the region of the pivotal connection between the head conveyor portion and the intermediate conveyor portion; and an actuator coupled with the conveyor elevator and operable to move the conveyor portions between an inoperative folded position and an unfolded working position;

in which the geometry of the conveyor portions and the link member, and the mounting of the tail conveyor portion and the link member on the chassis are such that;

when the conveyor elevator is in its folded inoperative position the tail conveyor portion is constrained to extend substantially horizontally over the chassis; the intermediate conveyor portion is constrained to extend upwardly of the tail portion; and the head conveyor portion is constrained to extend substantially horizontally of the upper end of the intermediate conveyor portion; and when the conveyor elevator is in its unfolded working position the conveyor portions extend substantially rectilinearly as a rigid assembly and in an upwardly sloping direction from the mounting of the tail portion on the chassis.

2. An endless conveyor elevator according to claim 1, in which the conveyor portions are inclined to the chassis at an angle of up to 30° when in the working position.

3. An endless conveyor elevator according to claim 1, in which the arrangement is such that the actuator is enabled to move the assembly of conveyor portions beyond the unfolded working position, so that it begins to fold in an opposite direction, in order that the free end of the head conveyor portion may be set lower than it would be if the three conveyor portions were to extend substantially rectilinearly.

4. An endless conveyor elevator according to claim 1, in which the conveyor portions are adapted to mount an endless troughed belt thereon.

5. A foldable framework for an endless belt conveyor which comprises:

a substantially straight middle conveyor section pivotally connected at either end to a head conveyor section and a tail conveyor section respectively, said conveyor sections being mechanically linked such that in a working position they are constrained to lie in a substantially straight line end-to-end and in a folded position the head section and the tail section are constrained to project approximately perpendicularly and to one side of the middle section, and also the tail conveyor section is pivotally connected adjacent to its free end to a chassis member, and also at least one link member is provided which is pivotally connected at one end to the chassis member and which is pivotally connected at its other end to the assembly of conveyor sections in the vicinity of the joint between the head section and the middle section, and also an actuator means is provided to enable the assembly of conveyor sections to be moved back and forth between the working and the folded position, and furthermore all said members are so proportioned that when the conveyor sections are in the folded position, the tail end section is constrained to lie substantially horizontally upon the chassis member and the middle section is constrained to stand approximately vertically and the head end section is constrained to project approximately horizontally above the chassis member from the upper end of the middle conveyor section, and when the conveyor sections are in the working position the three sections are constrained to form a single substantially straight conveyor framework which is supported adjacent to its lowermost end upon the chassis member, and which is supported by the link member or members in the vicinity of its uppermost joint in such a manner that it slopes upwardly at an angle of not more than 30°.

6. An endless conveyor elevator having a foldable support frame and which comprises:

a chassis;

a tail conveyor portion pivotally mounted at one end on the chassis and intended to form a lower input end of the elevator;

a head conveyor portion intended to form an upper discharge end of the elevator;

a first intermediate conveyor portion pivotally connected to the tail portion;

a second intermediate conveyor portion pivotally connected to the first intermediate conveyor portion and to the head conveyor portion;

at least one link member pivotally connected at one end to the chassis and at its other end to the conveyor in the region of the pivotal connection between the second intermediate conveyor portion and the first intermediate conveyor portion;

a further link member pivotally connected at one end to the head portion and at its other end to the first intermediate conveyor portion;

an actuator coupled with the conveyor elevator and operative to move the conveyor portions between an inoperative folded position and an unfolded working position;

in which the geometry of the conveyor portions and of said one and said further link member, and the mounting of the tail conveyor portion and said one link member on the chassis are such that;

when the conveyor elevator is in its folded inoperative position the tail conveyor portion is constrained to extend substantially horizontally over the chassis; the first intermediate conveyor portion is constrained to extend upwardly of the tail portion; the second intermediate conveyor portion is constrained to extend substantially horizontally of the upper end of the first intermediate conveyor portion; and the head portion is constrained to hang approximately vertically downwardly from the free end of the second intermediate portion; and when the conveyor elevator is in its unfolded working position the tail portion, the first and second intermediate portions, and the head portions constrained to extend rectilinearly as a rigid assembly and in an upwardly sloping direction from the mounting of the tail portion on the chassis.

* * * * *